Feb. 5, 1952     D. W. KELBEL     2,584,468
TRANSMISSION
Filed Oct. 9, 1947
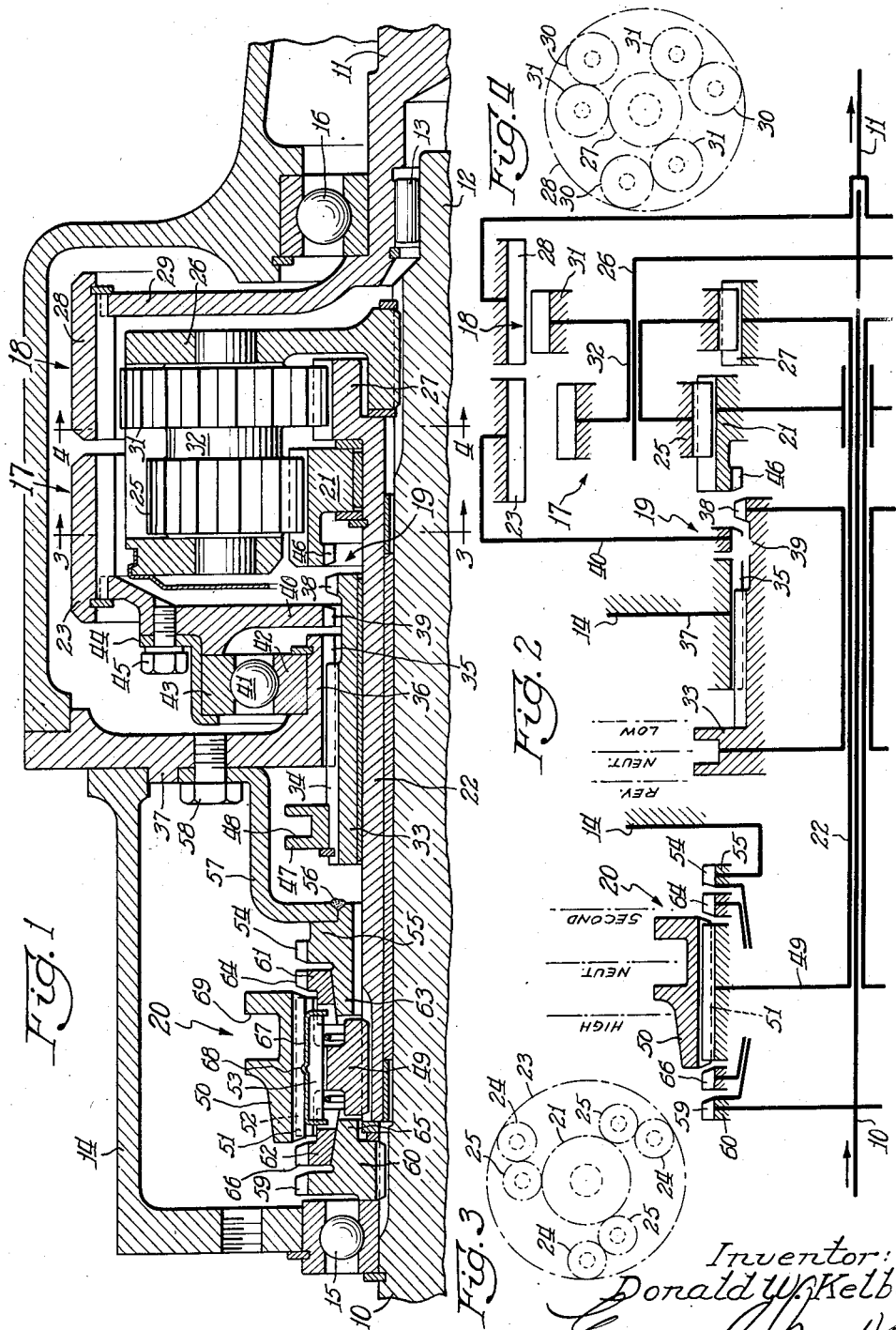
Inventor:
Donald W. Kelbel Patented Feb. 5, 1952

2,584,468

UNITED STATES PATENT OFFICE 2,584,468

TRANSMISSION

Donald W. Kelbel, Muncie, Ind., assignor to Borg-Warner Corporation, Chicago, Ill., a corporation of Illinois Application October 9, 1947, Serial No. 778,871

24 Claims. (Cl. 74—761)

1

This invention relates to variable speed transmissions and particularly to such transmissions employing planetary gear mechanism.

The princpial object of this invention is to provide a planetary transmission capable of producing three forward speeds, each of which speeds is made effective by the successive operation of plurality of coupling devices, each device controlling one or more speeds.

Another object of this invention is to provide a planetary transmission capable of producing a plurality of speed ratios corresponding to low, intermediate and high speed ratios of an ordinary standard automobile three-speed transmission of the countershaft type, and wherein a plurality of coupling devices utilized to establish the various speed ratios, may be operated, if desired, by conventional selecting and shifting mechanism including a lever movable in an H-path by the operator of the automobile.

A further object of this invention is to provide a transmission comprising complex planetary gearing controllable for providing at least three forward variable speed drives and reverse drive by a plurality of coupling devices, each of which is effective to establish two of said drives.

Another object of this invention is to provide an improved planetary transmission wherein a blocker-type synchronizer is utilized with coupling means controlling the planetary change speed mechanism of the transmission for establishing speed ratios above low speed ratio.

Another object of this invention is to provide an improved planetary transmission which is simple in construction, economically manufactured, compact in assembly and durable and efficient in use.

These and other advantages of this invention will become apparent from the following description when taken together with the accompanying drawing in which:

Fig. 1 is a longitudinal sectional view of a transmission embodying the principles of my invention;

Fig. 2 is a diagrammatic view of the transmission shown in Fig. 1;

Fig. 3 is a view taken on line 3—3 of Fig. 1; and

Fig. 4 is a view taken on line 4—4 of Fig. 1.

The drawing is to be understood as being more or less of a schematic character for the purpose of disclosing a typical or preferred embodiment of the improvements contemplated herein, and in the drawing like reference characters identify the same parts wherever these parts appear in the different views.

2

Referring to the drawing, the transmission illustrated with reference to its mechanical structure in Fig. 1 and diagrammatically in Fig. 2, comprises a drive or input shaft 10 having suitable operative connection with a motor or engine (not shown) and a driven or output shaft 11 disposed in axial alignment with the drive shaft 10. The drive shaft 10 is provided with a reduced end 12 supported by pilot bearings 13 in a recess in the front end of the driven shaft 11. The shafts 10 and 11 are rotatably mounted within a stationary housing or casing 14 having openings in its end walls to receive ball bearing assemblies 15 and 16 for respectively journalling the adjacent portions of the shafts.

The change speed mechanism of the transmission comprises two planetary gear sets generally designated 17 and 18. A plurality of controls are provided for the change speed mechanism to establish low, intermediate and high speed ratios and reverse drive. These controls comprise a coupling device in the form of a brake generally indicated 19 cooperating with the planetary gear set 17 to provide low speed ratio and reverse drive, respectively, and a combination positive clutch and brake device, generally designated 20, of the blocker-synchronizer type adapted to control the planetary gear set 18 to provide second or intermediate speed ratio or to provide third or high speed ratio, in a manner described more fully hereinafter.

Describing the planetary gear sets 17 and 18 and the control devices 19 and 20 therefor in detail, the planetary gear set 17 comprises a sun gear 21 rotatably mounted on a sleeve 22 rotatable on the drive shaft 10, a ring gear 23 and a series of meshing planet gears or pinions 24 and 25 mounted on a planet cage or carrier 26 splined to the drive shaft 10, the pinions 24 meshing with the ring gear 23 and the pinions 25 meshing with the sun gear 21 as shown in Fig. 3.

The planetary gear set 18 comprises a sun gear 27 formed integral with one end of the sleeve 22, a ring gear 28 connected to disc 29 integral with the driven shaft 11, and a series of meshing planet gears or pinions 30 and 31 of larger diameter and, therefore, having a greater number of teeth than the planet pinions 24 and 25 of the gear set 17, the planet pinions 30 meshing with the ring gear 28 and the pinions 31 meshing with the sun gear 27 as shown in Fig. 4. It will be noted from an inspection of Fig. 1 that each planet pinion 25 and a planet pinion 31 are formed on a spool 32 rotatably supported by the carrier 26 as shown in Fig. 1. The planet pinions 24 and planet pinions 30 are not of the spool type but are individual pinions rotatably mounted on individual pinion shafts (not shown) carried by the carrier 26.

Referring to the devices 19 and 20 for controlling the planetary gear sets 17 and 18 to provide the various forward speed ratios and reverse drive, the coupling device 19 is in the form of a brake and comprises a shift collar 33 surrounding the sleeve 22 and having external splines 34 meshing with internal splines 35 on an axially extending portion 36 of a wall 37 of the casing 14. The shift collar 33 is axially slidable on the sleeve 22 through its splined connection with the casing 14 and the splines 34 of the collar are relieved adjacent one end thereof to provide teeth 38 adapted, during movement of the collar to the left in Figs. 1 and 2, to mesh with teeth 39 formed on the inner periphery of an annular plate 40 connected at its outer periphery to the ring gear 23. The ring gear 23 and plate 40 are rotatably mounted on the axially extending portion 36 of the casing wall 37 through the medium of a ball bearing assembly 41 having its inner race 42 secured to the wall portion 36 and having its outer race 43 fixed to the plate 40 by a clamping member 44 secured to the plate 40 by a plurality of bolts 45. Upon engagement of the teeth 38 of the collar 33 and the teeth 39 of the plate 40, the ring gear 23 of the gear set 17 will be held against rotation to place the transmission in condition for driving the shaft 11 in a reverse direction with respect to the direction of rotation of the shaft 10.

The shift collar 33 is shiftable to the right in Figs. 1 and 2 to mesh its teeth 38 with internal teeth 46 on the sun gear 21 of the gear set 17 to hold the sun gear against rotation to place the transmission in condition for driving the shaft 11 in low gear ratio. The shift collar 33 has secured thereto a ring 47 having an annular groove 48 adapted to receive a shift fork (not shown) for actuating the collar 33.

The coupling device 20 is a combination positive brake and clutch and comprises a flanged hub member 49 splined to the sleeve 22 on which is formed the sun gear 27. A shift collar 50 is slidably mounted for movement in transverse directions parallel to the axis of the drive shaft 10 and bodily with respect to the flanged hub member 49. To permit this bodily sliding movement, the shift collar 50 has internal teeth or splines 51 that engage external teeth or splines 52 on the flange 53 of hub 49. Upon movement of the shift collar 50 to the right in Figs. 1 and 2, the teeth 51 of the collar will mesh with teeth 54 on a brake ring 55 welded as at 56 to a bracket 57 fixed to the wall 37 of the casing 14 by a plurality of bolts 58. The sleeve 22 and thereby sun gear 27 of the gear set 18 will thus be held against rotation to place the transmission in condition to rotate the driven shaft 11 in second or intermediate gear ratio. Upon movement of the shift collar 50 to the left in Figs. 1 and 2, the teeth 51 of the collar mesh with teeth 59 on the clutch ring 60 splined to the drive shaft 10. The planet carrier 26 and the sun gear 27 of the gear set 18 are thus connected to lock up the gear set 18 and, in effect, directly connect the shafts 10 and 11 to provide third speed ratio or direct drive.

Blocker-type synchronizing mechanisms are employed with the coupling device 20. This mechanism comprises blocker rings 61 and 62 on opposite sides of the hub 49 and the blocker ring 61 is provided with a tapered bore receiving a correspondingly tapered cone 63 on the brake ring and with which it is adapted to frictionally engage to slow down and stop the rotation of the shift collar 50 and thereby the sun gear 27 just prior to the engagement of the teeth 51 of the shift collar 50 with the teeth 54 of the stationary brake ring 55 whenever the shift collar 50 is shifted to the right in Figs. 1 and 2. The blocker ring 61 has teeth 64 and these teeth and the teeth 54 on the brake ring 55 are adapted to be aligned and engage the teeth 51 of the shift collar 50 after rotation of the shift collar 50 has stopped. The blocker ring 62 is also provided with a tapered bore for reception of a correspondingly tapered synchronizer cone 65, formed on the clutch ring 60, with which cone it is adapted to be frictionally engaged to synchronize the speeds of the clutch ring 60 and the shift collar 50 whenever the collar 50 is moved to the left in Figs. 1 and 2. The blocker ring 62 has teeth 66 and these teeth and the teeth 59 on the clutch ring 60 are adapted to be aligned with and engage the teeth 51 of the shift collar 50 after synchronization of the speeds of the clutch ring 60 and shift collar 50 has occurred. A strut element 67, of U-shape, is carried by the hub flange 53 and has an offset or hump 68 intermediate its ends that is adapted to enter a shallow depression on the inner surface of the shift collar 50 and acts to normally bias one or the other of the blocker rings to engaged position on their respective cones when the collar is moved from neutral position. The collar 50 is provided with a groove 69 for reception of a shifter fork (not shown) adapted to impart shifting movement to the collar for the purpose described above.

In the operation of the transmission and considering the driving shaft 10 to be rotating in a clockwise direction when viewed from the left of Figs. 1 and 2, first or low speed ratio is established by moving the shift collar 33 of the control device 19 to the right to mesh the teeth 38 of the collar with the teeth 46 on the sun gear 21 of the gear set 17 whereby the sun gear 21 will be locked to the casing 14 to serve as a reaction point. The drive will be from the input or drive shaft 10 to the planetary carrier 26, the planet gears 25 meshed with the stationary sun gear 21, the planet gears 31 and 30, to the ring gear 28 drivingly connected to the driven or output shaft 11.

To obtain second or intermediate speed ratio, the collar 33 is returned to its neutral position and the shift collar 50 of the control device 20 is moved to the right to mesh its teeth 51 with teeth 54 on the brake ring 55 thereby locking the sun gear 27 to the casing 14 to serve as a reaction or fulcrum point. The drive is then from the input shaft 10 to the planet carrier 26, the meshing planet pinions 30 and 31, and to the ring gear 28 and output shaft 11.

Third or high speed ratio or direct drive is established by moving the shift collar 50 to the left to mesh its teeth 51 with teeth 59 of the clutch ring 60 of the control device 20 to thereby connect the sun gear 27 to the input shaft 10 which will prevent relative rotation of the sun gear 27, meshing planet pinions 30 and 31, and ring gear 28 of the gear set 18 causing the input shaft 10, gear set 18 and output shaft 11 to rotate as a unit. The output shaft 11 will thus be rotated at the same speed as the input shaft 10.

Reverse drive is obtained by moving the shift collar 33 to the left to connect the teeth 38 of the collar to the teeth 39 of the plate 40 connected to the ring gear 23 of the gear set 17 to lock the ring gear to the casing and thereby hold the ring gear against rotation. The ring gear 23 is thus held stationary to serve as a reaction point and the drive will be from the input shaft 10 to the planetary carrier 26 and through all of the planet pinions of the gear sets, to the ring gear 28 connected to the output shaft 11, both of the sun gears 21 and 27 running idle under these circumstances.

It will be noted that shift collar 33 of the control device 19 is shiftable to selectively establish low speed ratio or reverse drive from an intermediate neutral position and also that the shift collar 50 of the control device 20 is shiftable to selectively establish second or intermediate speed ratio or high speed ratio from an intermediate neutral position. It will therefore be apparent the shift collars 33 and 50 are disposed and, if desired, may be shifted, in a manner similar to like control members of ordinary three-speed transmissions of the countershaft type, by conventional selecting and shifting mechanism used with such counter-shaft-type transmissions and which may include a lever movable in an H-path by the operator of the vehicle.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. In a transmission, an input element, an output element, two planetary gear sets connecting said elements and adapted to provide three different speed ratio drives and reverse drive, a slidable dual positionable brake selectively slidable to one position for braking one member of one gear set to provide one of said drives and selectively slidable to a second position for braking another member of said one gear set to provide a second one of said drives, and a slidable dual positionable engaging device selectively slidable to one position for braking a member of the other gear set to provide a third drive or selectively slidable to a second position for connecting said last mentioned member and a member common to both gear sets to provide the fourth drive.

2. In a transmission, an input element, an output element, planetary gear sets connecting said elements and adapted to provide three different speed ratio drives and reverse drive, a slidable dual positionable brake selectively slidable to one position for holding one member of one gear set against rotation to provide one of said drives and selectively slidable to a second position for holding another member of said one gear set to provide a second one of said drives, and a slidable dual positionable engaging device selectively slidable to one position for holding a member of the other gear set against rotation to provide a third drive or selectively slidable to a second position for connecting said last-mentioned member and a member common to both gear sets to provide the fourth drive.

3. In a transmission, an input element, an output element, planetary gear sets connecting said elements and adapted to provide three different speed ratio drives and reverse drive, each set comprising a ring gear member, a sun gear member, and planet pinions, a common carrier member for said pinions of both sets, a slidable dual positionable brake selectively slidable to one position for braking one member of one gear set to provide one of said drives and selectively slidable to a second position for braking another member of said one gear set to provide a second one of said drives, and a slidable dual positionable engaging device selectively slidable to one position for braking a member of the other gear set to provide a third drive or selectively slidable to a second position for connecting said last mentioned member and said carrier member to provide a fourth drive.

4. In a transmission, an input element, an output element, planetary gear sets connecting said elements and adapted to provide three different speed ratio drives and reverse drive, each set comprising a ring gear member, a sun gear member, and planet pinions, a common carrier member for said pinions of both sets, a device for selectively holding two members of one gear set against rotation of provide either of two of said drives, and a device for holding the sun gear member of the other gear set against rotation to provide a third drive or for connecting said last-mentioned sun gear member and said carrier member to provide a fourth drive.

5. In a transmission, an input element, an output element, planetary gear sets connecting said elements and adapted to provide a plurality different speed ratio drives and reverse drive between said elements, each set comprising a sun gear, a ring gear and planet pinions meshing with said sun and ring gears, means for optionally holding the sun gear or ring gear of one set against rotation to provide either of two of said drives, and means for holding the sun gear of the other set against rotation to provide another of said drives, the ring gear of said other set being directly connected to and rotatable with one of said elements during said drives.

6. In a transmission, an input element, an output element, planetary gear sets connecting said elements and adapted to provide a plurality of different speed ratio drives and reverse drive between said elements, each set comprising a sun gear, a ring gear and planet pinions meshing with each other, one pinion of each set meshing with the ring gear thereof, and the other pinion of each set meshing with the sun gear thereof, means for optionally holding the sun gear or ring gear of one set against rotation to provide either of two of said drives, and means for holding one of the gears of the other set against rotation to provide another of said drives.

7. In a transmission, an input element, an output element, planetary gear sets connecting said elements and adapted to provide a plurality of different speed ratio drives and reverse drive between said elements, each set comprising a sun gear, a ring gear, and planet pinions meshing with each other, one pinion of each set meshing with the ring gear thereof, and the other pinion of each set meshing with the sun gear thereof, releasable means for selectively controlling the gears of one set to provide either of two of said drives, and releasable means for controlling one of the gears of the other set to provide another of said drives.

8. In a transmission, an input element, an output element, planetary gear sets connecting said elements and adapted to provide a plurality of different speed ratio drives and reverse drive between said elements, each set comprising a sun gear, a ring gear and planet pinions meshing with the sun and ring gears respectively of their respective set, means for optionally holding the sun gear or ring gear of one set against rotation to provide either of two of said drives, and means for holding the sun gear of the other set against rotation to provide another of said drives, a ring gear of said other set being directly connected to and rotated with one of said elements during said drives.

9. In a transmission, an input element, an output element, planetary gear sets connecting said elements and adapted to provide a plurality of different speed ratio drives and reverse drive between said elements, each set comprising a sun gear, a ring gear and planet pinions meshing with each other, one pinion of each set meshing with the ring gear thereof, and the other pinion of each set meshing with the sun gear thereof, means for optionally holding the sun gear or ring gear of one set against rotation to provide either of two of said drives, and means for holding the sun gear of the other set against rotation to provide another of said drives.

10. In a transmission, an input element, an output element, planetary gear sets connecting said elements and adapted to provide a plurality of different speed ratio drives and reverse drive between said elements, each set comprising a sun gear, a ring gear, and planet pinions meshing with each other, one pinion of each set meshing with the ring gear thereof, and the other pinion of each set meshing with the sun gear thereof, releasable means for selectively controlling the gears of one set to provide either of two of said drives, and releasable means for controlling the sun gear of the other set to provide another of said drives.

11. In a transmission, an input shaft, an output shaft, planetary gear sets connecting said shafts and adapted to provide a plurality of different speed ratios and reverse drive between said elements, each set comprising a ring gear, a sun gear, and planet pinions meshing with each other, one pinion of each set meshing with the ring gear thereof, and the other pinion of each set meshing with the sun gear thereof, means connecting a planet pinion of one set with a planet pinion of the other set for rotation in unison, a common carrier for the planet pinions of both sets, releasable means for optionally holding the sun gear or ring gear of one set against rotation to establish one of said speed ratios or reverse drive, releasable means for optionally holding one of the gears of the other set or connecting said last-mentioned gear to said carrier to provide either of two other speed ratios.

12. In a transmission, an input shaft, an output shaft, planetary gear sets connecting said shafts and adapted to provide a plurality of different speed ratios and reverse drive between said elements, each set comprising a ring gear, a sun gear, and planet pinions meshing with each other, one pinion of each set meshing with the ring gear thereof, and the other pinion of each set meshing with the sun gear thereof, means connecting a planet pinion of one set with a planet pinion of the other set for rotation in unison, a common carrier for the planet pinions of both sets, releasable means for optionally holding the sun gear or ring gear of one set against rotation to establish one of said speed ratios or reverse drive, releasable means for optionally holding the sun gear of the other set or connecting said last-mentioned gear to said carrier to provide either of two other speed ratios.

13. In a transmission, an input shaft, an output shaft, planetary gear sets connecting said shafts and adapted to provide a plurality of different speed ratios and reverse drive between said elements, each set comprising a ring gear, a sun gear, and planet pinions meshing with each other, one pinion of each set meshing with the ring gear thereof, and the other pinion of each set meshing with the sun gear thereof, means operatively connecting a pinion of the other set for rotation in unison, a common carrier for the planet pinions of both sets, releasable means for optionally holding the sun gear or ring gear of one set against rotation to establish one of said speed ratios or reverse drive, releasable means for optionally holding one of the gears of the other set or connecting said last-mentioned gear to said carrier to provide either of two other speed ratios.

14. In a transmission, an input shaft, an output shaft, planetary gear sets connecting said shafts and adapted to provide a plurality of different speed ratios and reverse drive between said elements, each set comprising a ring gear, a sun gear, and planet pinions meshing with each other, one pinion of each set meshing with the ring gear thereof, and the other pinion of each set meshing with the sun gear thereof, means operatively connecting a pinion of the other set for rotation in unison, a common carrier for the planet pinions of both sets, releasable means for optionally holding the sun gear or ring gear of one set against rotation to establish one of said speed ratios or reverse drive, releasable means for optionally holding the sun gear of the other set or connecting said last-mentioned gear to said carrier to provide either of two other speed ratios.

15. In a transmission, an input shaft, an output shaft, planetary gear sets connecting said shafts and adapted to provide a plurality of different speed ratios, each set comprising a ring gear, a sun gear, and planet pinions meshing with each other, one pinion of each set meshing with the ring gear thereof, and the other pinion of each set meshing with the sun gear thereof, and releasable means for optionally controlling one of the gears of one set to provide one of said speed ratios or one of the gears of the other set to provide another of said speed ratios.

16. In a transmission, an input shaft, an output shaft, planetary gear sets connecting said shafts and adapted to provide a plurality of different speed ratios, each set comprising a ring gear, a sun gear, and planet pinions meshing with each other, one pinion of each set meshing with the ring gear thereof, and the other pinion of each set meshing with the sun gear thereof, and releasable means for holding one of the gears of one set against rotation to provide one of said speed ratios or for holding one of the gears of the other set against rotation to provide another of said speed ratios.

17. In a transmission, an input shaft, an output shaft, planetary gear sets connecting said shafts, each of said sets comprising a sun gear, a ring gear, planet pinions meshing with each other, one pinion of each set meshing with the ring gear thereof, and the other pinion of each set meshing with the sun gear thereof, one of the planet pinions of one set being fixed to one of the planet pinions of the other set, and means for optionally controlling one or the other of the gears of one of said sets to establish drive of said output shaft at a speed different than said input shaft or in a reverse direction of rotation than said input shaft.

18. In a transmission, an input shaft, an output shaft, planetary gear sets connecting said shafts, each of said sets comprising a sun gear, a ring gear, planet pinions meshing with each other, one pinion of each set meshing with the ring gear thereof, and the other pinion of each set meshing with the sun gear thereof, one of the planet pinions of one set being fixed to one of the planet pinions of the other set, and releasable means for optionally holding one or the other of the gears of one set against rotation to establish drive of said output shaft at a speed different than said input shaft or to establish drive of said output shaft in a reverse direction of rotation than said input shaft.

19. In a transmission, an input shaft, an output shaft, planetary gear sets connecting said shafts and adapted to provide a plurality of speed ratios between said shafts, each of said sets comprising a sun gear rotatable relative to said shafts, a ring gear, and planet pinion meshing with each other, one pinion of each set meshing with the ring gear thereof, and the other pinion of each set meshing with the sun gear thereof, a common carrier for the planet pinions of said gear sets and connected to said input shaft, the ring gear of one of said sets being connected to the output shaft and the ring gear of the other of said sets being rotatable relative to said shafts, releasable means for optionally holding one or the other of said sun gears against rotation to provide either of two of said speed ratios, and releasable means for connecting one of said sun gears to said carrier to provide another speed ratio.

20. In a transmission, an input element, an output element, planetary gearing connecting said elements and adapted to provide three different speed ratio drives and a reverse drive, a dual positionable slidable brake for selectively braking two members of said planetary gearing to respectively provide either of two of said drives, and a dual positionable engaging device for selectively braking a third member of the planetary gearing to respectively provide a third drive or for selectively connecting said third member and a fourth member of the planetary gearing to respectively provide the fourth drive.

21. In a transmission, the combination of an input shaft, an output shaft, planetary gear mechanism connecting said shafts adapted to provide a plurality of different drives between said shafts and including a first sun gear, a second sun gear, a ring gear and a planet gear carrier, and a plurality of selectively operable means for selectively holding said first sun gear, said second sun gear or said ring gear against rotation, or connecting said second sun gear to said planet gear carrier to respectively establish said drives between said shafts.

22. In a transmission, the combination of an input shaft, an output shaft, planetary gear mechanism connecting said shafts adapted to provide a plurality of different forward drives and a reverse drive between said shafts and including a first sun gear, a second sun gear, a ring gear and a planet carrier, a first selectively operable means for holding said ring gear against rotation to establish said reverse drive between said shafts, and a plurality of other selectively operable means for selectively holding either of said sun gears against rotation or connecting said first sun gear to said planet carrier to respectively establish said forward drives between said shafts.

23. In a transmission, the combination of an input shaft, an output shaft, planetary gear mechanism connecting said shafts adapted to provide a plurality of reduced forward speed drives, a direct drive and a reverse drive between said shafts, said planetary gear mechanism including a first sun gear, a second sun gear, a ring gear and a planet gear carrier, a first selectively operable means for holding said ring gear against rotation to establish said reverse drive between said shafts, a second selectively operable means for connecting said first sun gear to said planet gear carrier to establish said direct drive between said shafts, and a plurality of other selectively operable means for selectively holding either of said sun gears against rotation to respectively establish said reduced forward speed drives between said shafts.

24. In a transmission, the combination of an input shaft, an output shaft, planetary gear mechanism connecting said shafts adapted to provide a pair of reduced forward speed drives, a direct drive and a reverse drive between said shafts, said planetary gear mechanism including a first sun gear, a second sun gear, a ring gear, and a planet gear carrier, and a plurality of selectively operable devices, a first one of said devices for holding said ring gear against rotation to establish said reverse drive between said shafts, a second one of said devices for connecting said first sun gear to said planet gear carrier to establish said direct drive between said shafts, a third one of said devices for holding one of said sun gears against rotation to establish one of said reduced forward speed drives between said shafts, and a fourth one of said devices for holding the other one of said sun gears against rotation to establish the other one of said reduced forward speed drives between said shafts.

DONALD W. KELBEL.

REFERENCES CITED

The following references are of record in the file of this patent:

UNITED STATES PATENTS

| Number | Name | Date |
|---|---|---|
| 1,083,863 | Schortman | Jan. 6, 1914 |
| 1,546,287 | Koerber | July 14, 1925 |
| 1,901,194 | Salerni | Mar. 14, 1933 |
| 1,984,235 | Sharpe | Dec. 11, 1934 |
| 2,214,335 | Kurti | Sept. 10, 1940 |

FOREIGN PATENTS

| Number | Country | Date |
|---|---|---|
| 150,356 | Germany | Apr. 13, 1904 |
| 300,667 | Great Britain | Nov. 9, 1928 |